United States Patent

Tack, Jr.

[11] Patent Number: 5,839,549
[45] Date of Patent: Nov. 24, 1998

[54] BRAKE SHOE ASSEMBLY AND KEY FOR RAILWAY VEHICLES

[75] Inventor: Carl E. Tack, Jr., Oak Park, Ill.

[73] Assignee: TransDyne, Inc., Chicago, Ill.

[21] Appl. No.: 950,309

[22] Filed: Oct. 14, 1997

Related U.S. Application Data

[63] Continuation of Ser. No. 681,215, Jul. 22, 1996, abandoned.

[51] Int. Cl.[6] ..................................................... F16D 65/04
[52] U.S. Cl. ............................................................ 188/243
[58] Field of Search ................................... 188/234, 235, 188/236, 242, 243, 244, 245

[56] References Cited

U.S. PATENT DOCUMENTS

| | | | |
|---|---|---|---|
| 1,965,159 | 7/1934 | Sargent | 188/243 |
| 2,230,863 | 2/1941 | Caslin | 188/243 |
| 3,077,957 | 2/1963 | Arrasmith | 188/243 |
| 4,466,513 | 8/1984 | Dedek | 188/243 |

FOREIGN PATENT DOCUMENTS 6324  6/1907  United Kingdom .................... 188/243

*Primary Examiner*—Peter M. Poon
*Attorney, Agent, or Firm*—Russell W. Pyle; Juettner, Pyle, Piontek & Underwood

[57] ABSTRACT

A brake shoe key is driven into operative engagement between a conventional brake shoe and a brake shoe support head in order to removably attach the brake shoe to the head. The brake shoe key is composed of cold workable austenitic stainless steel such that the key does not form stress cracks during fabrication and becomes stronger upon installation by driving.

1 Claim, 1 Drawing Sheet

BRAKE SHOE ASSEMBLY AND KEY FOR RAILWAY VEHICLES

This application is a continuation of U.S. application Ser. No. 08/681,215, filed Jul. 22, 1996 now abandoned.

BACKGROUND OF THE INVENTION

This invention relates to brake shoe keys for railway vehicles.

The type of brake shoe key in current use is shown in U.S. Pat. No. 3,077,957, and the design of such key and its construction are set forth in specifications set forth by the Association of American Railroads. The function of the key is to removably hang a brake shoe from an associated brake shoe head, and to allow periodic renewal of the brake shoe.

As currently specified, brake shoe keys are made from medium to high carbon content spring steel. A strip of the steel is stamped to obtain a rectangle, and the rectangle is then hot pressed in to the final arcuate shape. The key is hot quenched and is then tempered or heat treated to a final hardness of $R_c43$ to $R_c50$.

The above quenching operation may result in cracks which are difficult to detect. The relatively brittle key is installed by pounding with a sledgehammer, and this may also result in cracks or breakage. Once installed, the keys are subject to corrosion. Upon installation, the key merely acts as a hanger for the shoe and is not subject to additional bending stresses.

As a result of the foregoing considerations, brake shoe key failure is a common problem in the railway industry. Key failure causes loss of the brake shoe and loss of braking power, as well as possible subsequent damage to the relatively expensive brake shoe head and to the wheel due to direct contact while braking.

SUMMARY OF THE INVENTION

In accordance with the present invention, a railway brake shoe is composed of a cold workable steel, preferably a stainless steel having an austenitic crystal structure. The key may be prepared from a rectangular strip of the stainless steel by hot forming and air cooling, and the possibility of quench cracking is eliminated. Also, upon installation by pounding with a hammer, the strength and hardness of the key is increased. Finally, the stainless steel is free from corrosion.

Although the properties of austenitic stainless steel have been known for many years, there have been no proposals to modify the properties of the conventional heat hardenable brake shoe key for more than fifty years, and the breakage problem has continued, unabated with no solution.

DESCRIPTION OF THE PREFERRED EMBODIMENTS

Figure 1:
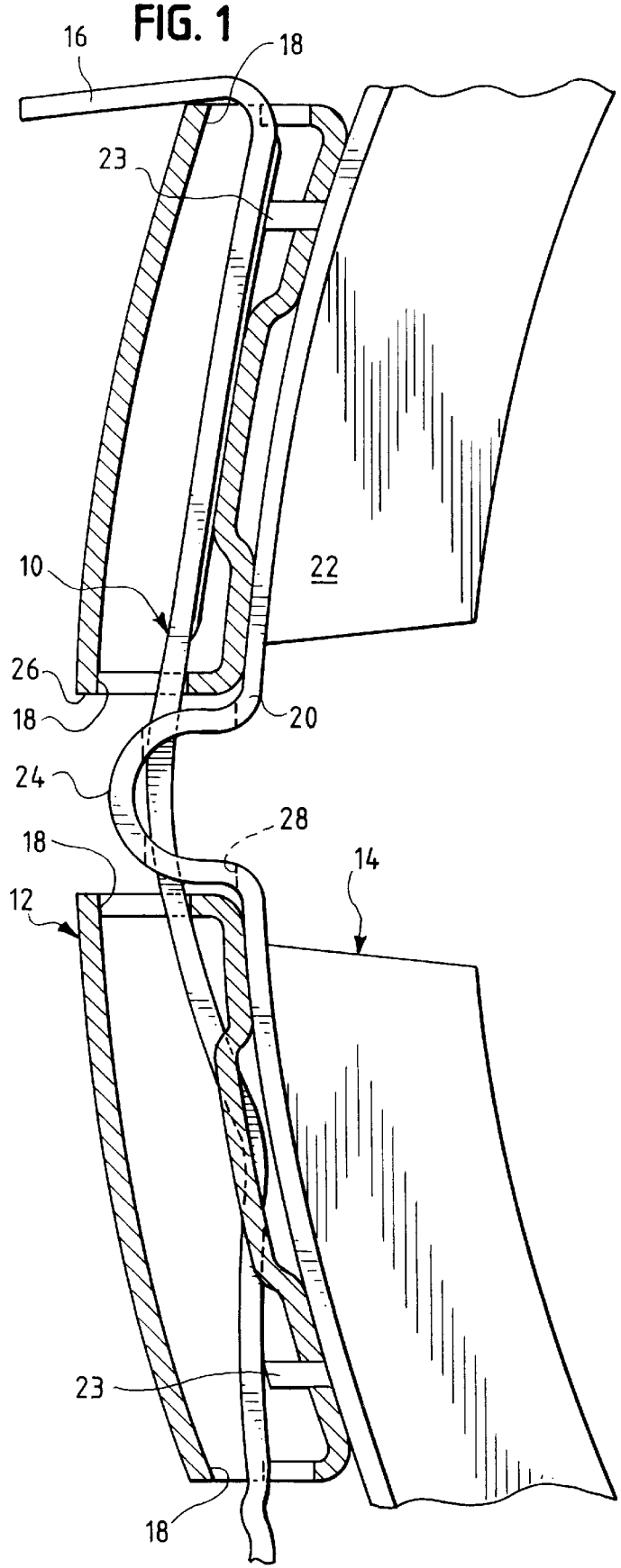
FIG. 1 is a partial sectional view of a railway brake assembly, wherein the key of the present invention is shown in elevation.
Figure 2:
FIG. 2 is a rear elevational view of the brake shoe key shown in FIG. 1.

The physical form of the brake shoe key 10 and its relation between the brake shoe head 12 and the brake shoe 14 are conventional and are shown in FIGS. 1 and 2. The generally elongate and arcuate or concave key 10 has a bent over head 16. The key 10 is inserted through openings 18 in the brake head 12. The brake shoe comprises a concave backing member 20 to which is secured a layer of friction material 22. The backing member 20 has spaced projecting lugs 23 which engage with and resiliently deflect the key 10 upon installation. The lugs also engage through corresponding openings in the brake head.

The brake shoe backing member 20 also has a secured or internal strap 24 projecting into a recess 26 of the brake head 12. An aperture 28 is provided in the strap 24, and a medial portion of the key 10 passes through aperture 28, such that the key serves as a loose removable hanger for the brake shoe. These features and other details are conventional and well known to those skilled in the art and are described in detail in U.S. Pat. No. 3,077,957, incorporated herein by reference. A more modern description of the details of a composition brake shoe, brake shoe head and key is found in U.S. Pat. No. 4,466,513, incorporated herein by reference.

In accordance with the present invention, the key 10 is composed of cold workable steel and preferably austenitic stainless steel. Such stainless steels are cold workable and not subject to corrosion. In general, this class of stainless steels has a carbon content below about 0.2%, a chromium content in excess of 17%, and a nickel content of 8% or greater. The keys are prepared by cold forming or by hot forming a rectangular flat strip of the stainless steel into the form shown in FIGS. 1 and 2, or into other desired form, followed by air cooling. No quenching or hot tempering is employed. The key is then driven into a locked, spring loaded position as shown in FIG. 1.

What is claimed is:

1. A railway brake assembly comprising a brake shoe, and brake shoe head means for supporting the brake shoe, and key means driven under tension between said brake head means and said brake shoe for attaching said brake shoe to said brake shoe head means, said key means being composed of cold work hardenable austenitic stainless steel, said austenitic stainless steel having a carbon content below about 0.2%, a chromium content in excess of 17%, and a nickel content of at least 8%.

* * * * *